United States Patent
Whitney et al.

(10) Patent No.: US 8,386,150 B2
(45) Date of Patent: Feb. 26, 2013

(54) FUEL CUTOFF TRANSITION CONTROL SYSTEMS AND METHODS

(75) Inventors: Christopher E. Whitney, Commerce, MI (US); Jun Lu, Novi, MI (US); Michael J. Pitsch, Ann Arbor, MI (US); Ryan Goode, Howell, MI (US); Krishnendu Kar, South Lyon, MI (US)

(73) Assignee: GM Global Technology Operations LLC (US)

(*) Notice: Subject to any disclaimer, the term of this patent is extended or adjusted under 35 U.S.C. 154(b) by 421 days.

(21) Appl. No.: 12/769,308

(22) Filed: Apr. 28, 2010

(65) Prior Publication Data

US 2011/0270509 A1 Nov. 3, 2011

(51) Int. Cl.
*F02D 41/30* (2006.01)

(52) U.S. Cl. ........ 701/103; 701/110; 701/112; 123/436; 123/481; 123/406.23

(58) Field of Classification Search .................. 123/436, 123/443, 676, 481, 482, 406.23, 406.24, 123/406.32, 406.44, 406.47; 701/103, 110, 701/112

See application file for complete search history.

(56) References Cited

U.S. PATENT DOCUMENTS

| | | | | |
|---|---|---|---|---|
| 5,655,508 A | * | 8/1997 | Nonaka | 123/683 |
| 5,658,217 A | * | 8/1997 | Tsukada | 477/109 |
| 5,685,800 A | * | 11/1997 | Toukura | 477/90 |
| 6,907,871 B2 | * | 6/2005 | Fukusako et al. | 123/594 |
| 7,526,375 B2 | * | 4/2009 | Buslepp et al. | 701/112 |
| 2012/0116647 A1 | * | 5/2012 | Pochner et al. | 701/102 |

* cited by examiner

*Primary Examiner* — Hai Huynh (57) ABSTRACT

An engine control system includes a fuel cutoff (FCO) module, a fuel control module, and a spark control module. The FCO module, when a FCO event is disabled, determines a feed-forward (FF) number of cylinders to offset a delay period associated with supplying fuel to the cylinders of an engine and selectively maintains a FCO torque request at a predetermined torque. The fuel control module commands fuel be supplied to the FF number of cylinders of the engine when the FCO event is disabled. The spark control module maintains a spark timing of the FF number of cylinders at a fully retarded spark timing based on the FCO torque request.

20 Claims, 5 Drawing Sheets

FUEL CUTOFF TRANSITION CONTROL SYSTEMS AND METHODS

FIELD

The present disclosure relates to internal combustion engines and more particularly to engine actuators.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

Traditional engine control systems control engine output torque using air flow in spark-ignition engines and using fuel flow in compression-ignition engines. When one or more faults are diagnosed, traditional engine control systems transition to engine shutdown. For example only, traditional engine control systems may disable fuel to the engine and prevent airflow into the engine.

SUMMARY

An engine control system includes a fuel cutoff (FCO) module, a fuel control module, and a spark control module. The FCO module, when a FCO event is disabled, determines a feed-forward (FF) number of cylinders to offset a delay period associated with supplying fuel to the cylinders of an engine and selectively maintains a FCO torque request at a predetermined torque. The fuel control module commands fuel be supplied to the FF number of cylinders of the engine when the FCO event is disabled. The spark control module maintains a spark timing of the FF number of cylinders at a fully retarded spark timing based on the FCO torque request.

An engine control method includes: determining a feed-forward (FF) number of cylinders to offset a delay period associated with supplying fuel to the cylinders of an engine when a FCO event is disabled; selectively maintaining a FCO torque request at a predetermined torque when the FCO event is disabled; commanding fuel be supplied to the FF number of cylinders of the engine when the FCO event is disabled; and maintaining a spark timing of the FF number of cylinders at a fully retarded spark timing based on the FCO torque request when the FCO event is disabled.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
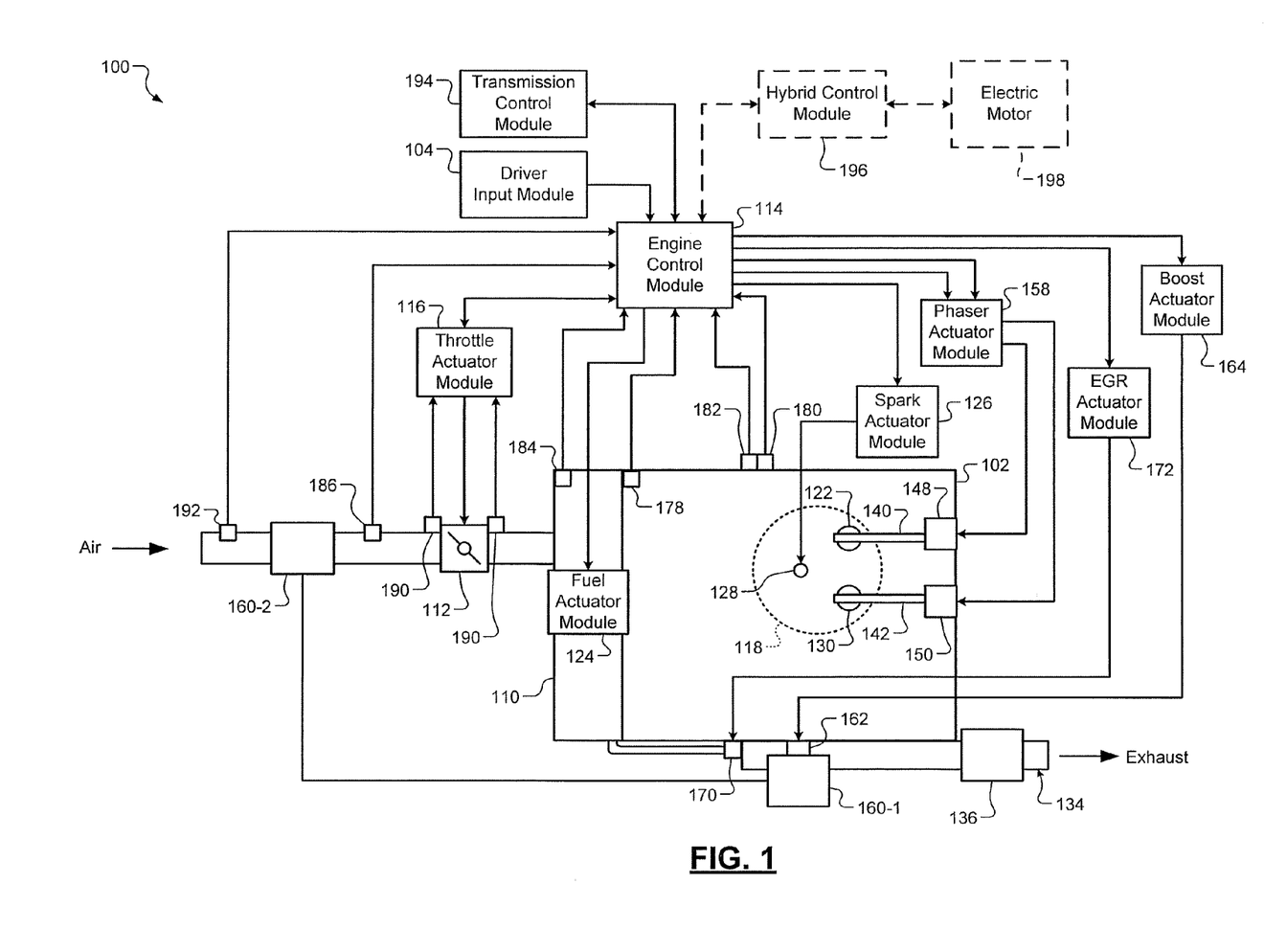
FIG. 1 is a functional block diagram of an exemplary implementation of an engine system according to the principles of the present disclosure.
Figure 2:
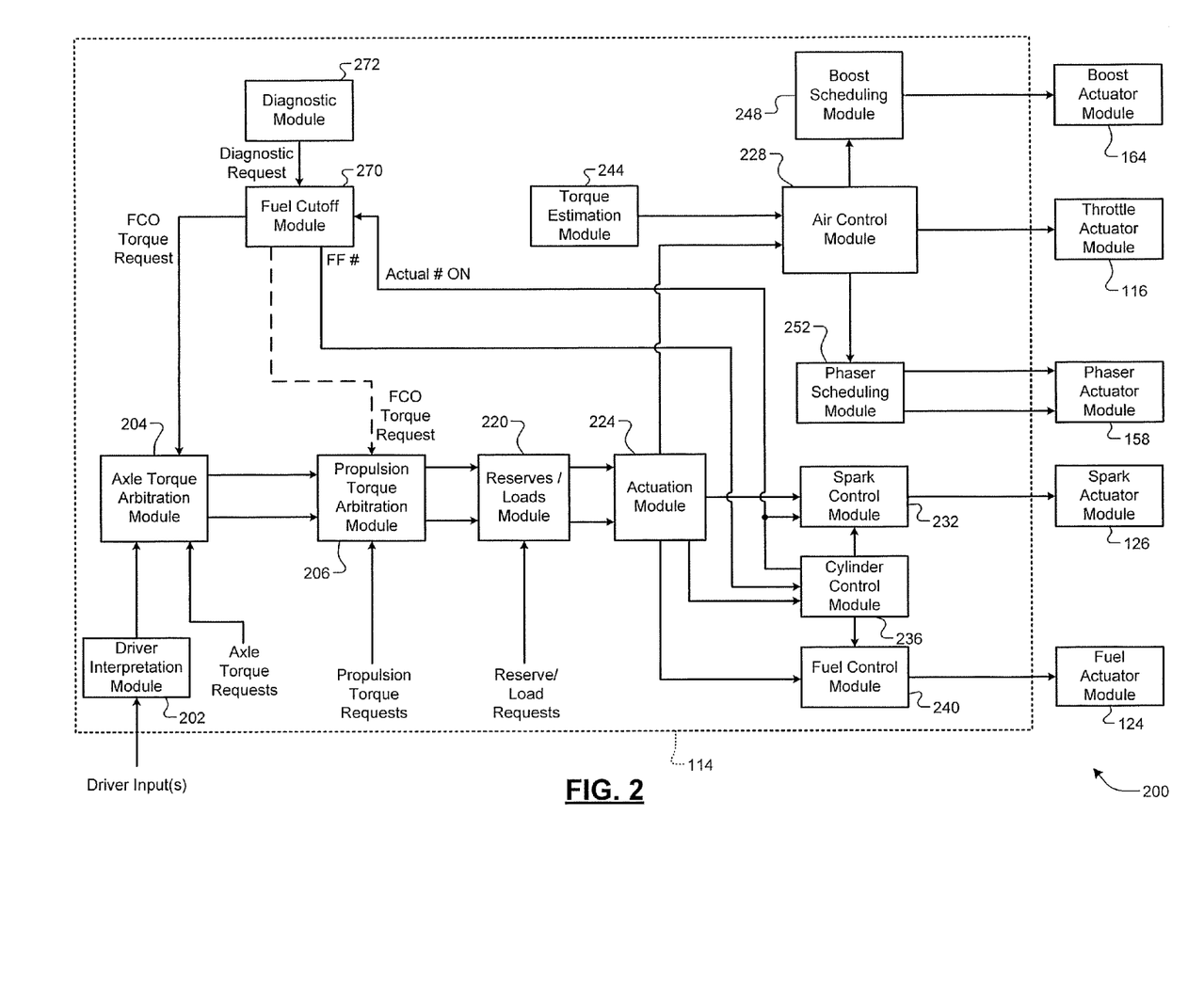
FIG. 2 is functional block diagram of an exemplary implementation of an engine control system according to the principles of the present disclosure.

FIG. 1 includes an exemplary engine system. FIG. 2 includes an exemplary engine control system including an exemplary control module. The control module controls torque output by an internal combustion engine. In some circumstances, the control module may disable provision of fuel to cylinders of the engine while the vehicle is running (e.g., key ON), such as during vehicle deceleration. A fuel cutoff (FCO) event occurs when the control module disables the provision of fuel and spark to the cylinders of the engine. The control module may perform a FCO event to, for example, decrease fuel consumption.

When the FCO event ends, the control module of the present disclosure determines a feed-forward (FF) number of cylinders to offset a delay period associated with supplying fuel to cylinders of the engine for a first combustion event. The control module maintains the spark timing for the FF number of cylinders at a fully retarded spark timing for the first combustion events of the cylinders. Maintaining the spark timing at the fully retarded spark timing minimizes vibration experienced within a passenger cabin of the vehicle when the FF number of cylinders begin to produce torque.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module (not shown) to selectively deactivate some of the cylinders, which may improve fuel economy under certain engine operating conditions.

The engine 102 may operate using a four-stroke cylinder cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated (i.e., OFF) cylinders.

Generating the spark in a cylinder that activated may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134. A catalyst 136 receives exhaust gas output by the engine 102 and reacts with various components of the exhaust gas. For example only, the catalyst may include a three-way catalyst (TWC), a catalytic converter, or another suitable exhaust catalyst.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). The cylinder actuator module may selectively disable opening of the intake valve 122 and/or the exhaust valve 130. In various implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve actuation (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also absorb heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the rotational speed of the crankshaft (i.e., engine speed) in revolutions per minute (RPM) using an RPM sensor 178. The rotational speed of the crankshaft may be referred to as engine speed. Temperature of engine oil may be measured using an oil temperature (OT) sensor 180. Temperature of engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from one or more of the sensors to make control decisions for the engine system 100.

The ECM 114 may communicate with a transmission control module 194 to coordinate shifting gears (and more specifically gear ratio) in a transmission (not shown). For example only, the ECM 114 may reduce engine output torque during a gear shift. The ECM 114 may communicate with a hybrid control module 196, for example, to coordinate operation (i.e., torque output production) of the engine 102 and an electric motor 198.

The electric motor 198 may also function as a generator, and may be used to produce electrical energy for use by vehicle electrical systems and/or for storage in an energy storage device (e.g., a battery). The production of electrical energy may be referred to as regenerative braking. The electric motor 198 may apply a braking (i.e., negative) torque on the engine 102 to perform regenerative braking and produce electrical energy. The engine system 100 may also include one or more additional electric motors. In various implementations, various functions of the ECM 114, the transmission control module 194, and the hybrid control module 196 may be integrated into one or more modules.

Each system that varies an engine parameter may be referred to as an engine actuator. Each engine actuator receives an associated actuator value. For example, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

The spark actuator module 126 may similarly be referred to as an engine actuator, while the associated actuator value may be the amount of spark advance relative to cylinder TDC. Other actuators may include the cylinder actuator module, the fuel actuator module 124, the phaser actuator module 158, the boost actuator module 164, and the EGR actuator module 172. For these engine actuators, the associated actuator values may include to number of activated cylinders, fueling rate, intake and exhaust cam phaser angles, boost pressure, and EGR valve opening area, respectively. The ECM 114 may control actuator values in order to cause the engine 102 to achieve a target engine output torque.

Referring now to FIG. 2, a functional block diagram of an exemplary engine control system 200 is presented. An exemplary implementation of the ECM 114 includes a driver torque module 202. The driver torque module 202 may determine a driver torque request based on driver input(s) from the driver input module 104, such as an accelerator pedal position and/or a brake pedal position. The driver input may also be based on cruise control, which may be an adaptive cruise control system that varies vehicle speed to maintain a predetermined following distance. The driver torque module 202 may store one or more mappings of accelerator pedal position to driver torque request and may determine the driver torque request based on a selected one of the mappings.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases. Each torque request may include data indicating the system or module that generated that torque request (i.e., the requestor).

Axle torque requests may include a torque reduction requested by a traction control system when positive wheel slip is detected. Positive wheel slip occurs when the friction between the wheels and the road surface is overcome, and the wheels begin to slip against the road surface in a forward direction. Axle torque requests may also include a torque increase request to counteract negative wheel slip, where a tire of the vehicle slips in a reverse direction with respect to the road surface because the axle torque is negative.

Axle torque requests may also include brake management requests and vehicle over-speed torque requests. Brake management requests may reduce the engine output torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules before being used to control actuators of the engine 102.

In general terms, the immediate torque request is the amount of currently desired engine output torque, while the predicted torque request is the amount of engine output torque that may be needed on short notice. The ECM 114 therefore controls the engine system 100 to produce an engine output torque equal to the immediate torque request. However, different combinations of actuator values may result in the production of the same engine output torque. The ECM 114 may therefore control the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing positive wheel slip on a surface having a low coefficient of friction (e.g., ice). In such a case, a traction control system (not shown) may request a reduction via the immediate torque request, and the ECM 114 reduces the engine output torque to the immediate torque request. However, the ECM 114 may control the engine actuators so that production of the predicted torque request may be resumed quickly once the positive wheel slip stops.

In general terms, the difference between the immediate torque request and the predicted torque request can be referred to as a torque reserve. The torque reserve represents the amount of torque more than the immediate torque request that the engine 102 can begin to produce with minimal delay. Fast engine actuators are used to increase or decrease the engine output torque. As described in more detail below, fast engine actuators are defined based on their ability to produce a response in the engine output torque relatively faster than slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque varying capacity of the fast engine actuators.

For example only, fast engine actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the upper limit of the range, which is the predicted torque request.

In general terms, fast engine actuators can change the engine output torque more quickly than slow engine actuators can. Slow engine actuators may respond more slowly to changes in their respective actuator values than fast engine actuators do. For example, a slow engine actuator may include mechanical components that require time to move from one position to another in response to a change in the associated actuator value.

A slow engine actuator may also be characterized by the amount of time it takes for the engine output torque to begin to change once the slow engine actuator begins to implement the changed actuator value. Generally, this amount of time will be longer for slow engine actuators than for fast engine actuators. In addition, even after the engine output torque begins to change, the engine output torque may take longer to reach an engine output torque that is expected to result from the changed actuator value.

For example only, the ECM 114 may set actuator values for slow engine actuators to values that would enable the engine 102 to produce the predicted torque request if the fast engine actuators were set to appropriate values. Meanwhile, the ECM 114 may set actuator values for fast engine actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values associated with one or more fast engine actuators to values that correspond to the predicted torque request. Because the actuator values associated with the slow engine actuators have already been set based on the predicted torque request, the engine 102 is able to produce the predicted torque request after only the delay attributable to the fast engine actuators. In other words, the longer delay that would otherwise result from changing the engine output torque using slow engine actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request.

The resulting torque reserve can be used to offset sudden increases in required engine output torque. For example only, sudden loads imposed by an air conditioner and/or a power steering pump may be offset by increasing the immediate torque request. If the increase in immediate torque request is less than the torque reserve, the increase can be quickly produced by using only fast engine actuators. The predicted torque request may also be increased to re-establish the torque reserve.

Another exemplary use of a torque reserve is to reduce fluctuations in slow actuator values. Because of their relatively slow speed, varying slow actuator values may cause control instability. In addition, slow engine actuators may include mechanical parts, which may draw more power and/or wear more quickly when moved frequently.

Creating a sufficient torque reserve allows changes in desired torque to be made by varying fast engine actuators via the immediate torque request while maintaining the values of the slow engine actuators. For example only, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, compression-ignition engines may combust fuels including, for example, diesel, by compressing the fuels.

After receiving a new actuator value, the spark actuator module 126 may be able to change spark timing for a next firing event. The next firing event may be within a next cylinder in a predetermined firing order of the cylinders. When the spark timing (also called spark advance) for a firing event is set to a calibrated value, a maximum torque is produced in the combustion stroke immediately following the firing event.

However, a spark advance deviating from the calibrated value may reduce the amount of torque produced in the combustion stroke. Therefore, the spark actuator module 126 may be able to vary engine output torque as early as the next firing event by varying the spark timing. For example only, a table of spark timings corresponding to different engine operating conditions may be determined during a calibration phase of vehicle design, and the calibrated value may be selected from the table based on current engine operating conditions.

In contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, airflow changes based on the throttle valve opening are subject to transport delays, such as drawing a different amount of air into the intake manifold 110 and drawing the air into the cylinders. Further, increased airflow into the intake manifold 110 is not realized as an increase in engine output torque until the cylinder 118 receives additional air in the next intake stroke, compresses the additional air, and commences the combustion stroke.

Using the throttle opening area and the spark timing in an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough airflow for the engine 102 to produce the predicted torque request, the spark timing is retarded (which reduces the engine output torque) based on the immediate torque request. The engine output torque will therefore be equal to the immediate torque request.

When additional torque is needed, such as when the air conditioning compressor is engaged, or when traction control determines that wheel slip has ended, the spark timing can be set based on the predicted torque request. By the following firing event, the spark actuator module 126 may return the spark timing to a calibrated value, which allows the engine 102 to produce the maximum engine output torque. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. Depending on the type of hybrid vehicle, the axle torque arbitration module 204 may output the predicted and immediate torque requests to the hybrid control module 196.

The predicted and immediate torque requests received by the propulsion torque arbitration module 206 are converted from an axle torque domain (torque at the wheels or axles) into a propulsion torque domain (torque at the crankshaft). In some implementations, the predicted and immediate torque requests may be converted into the propulsion torque domain before being provided to the propulsion torque arbitration module 206.

In some implementations, the predicted and immediate torque requests in the propulsion torque domain may be provided to the hybrid control module 196. The hybrid control module 196 may control the electric motor 198 based on one or more of the torque requests and may provide modified predicted and immediate torque requests to the propulsion torque arbitration module 206.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request based on the arbitration. The arbitrated torque requests may be generated by selecting a winning request from among received requests. Alternatively or additionally, the arbitrated torque requests may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other requestors may be informed that they have lost arbitration.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

The actuation module 224 receives the predicted and immediate torque requests from the reserves/loads module 220. The actuation module 224 determines how the predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow engine actuator that allows for a wide range of torque control. The actuation module 224 may disable cylinders using the cylinder actuator module, which also provides for a wide range of torque control, but may also be slow and may involve drivability and emissions concerns. The actuation module 224 may use spark timing as a fast engine actuator. However, spark timing may not provide as much range of torque control. In addition, the amount of torque control possible with changes in spark timing (referred to as spark reserve capacity) may vary as one or more airflow conditions change.

In various implementations, the actuation module 224 may generate an air torque request based on the predicted torque request. The air torque request may be equal to the predicted torque request, thereby controlling engine airflow actuators so that the arbitrated predicted torque request can be rapidly achieved by adjusting one or more actuator values associated with fast engine actuators.

An air control module 228 may determine desired actuator values for the engine airflow actuators based on the air torque request. For example, the air control module 228 may determine a desired manifold absolute pressure (MAP), a desired throttle area, and/or a desired air per cylinder (APC). The desired MAP may be used to determine desired boost, and the desired APC may be used to determine desired cam phaser positions. In various implementations, the air control module 228 may also determine a desired opening of the EGR valve 170 and other engine airflow parameters.

The actuation module 224 may also generate a spark torque request, a cylinder shut-off torque request, and a fuel mass torque request. For example only, the actuation module 224 may generate the spark torque request, the cylinder shut-off torque request, and/or the fuel mass torque request based on the immediate torque request.

The actuation module 224 may generate one or more of these requests based on the requestor. An exemplary illustration of when the actuation module 224 may generate one of these torque requests based on the requestor is when a fuel cutoff module 270 generates an immediate torque request for disabling the provision of fuel to the engine 102. The fuel cutoff module 270 is discussed further below.

The spark torque request may be used by a spark control module 232 to determine how much to retard the spark timing (which reduces the engine output torque) relative to the calibrated spark advance. The cylinder shut-off torque request may be used by a cylinder control module 236 to determine how many cylinders to deactivate. The cylinder control module 236 may instruct the cylinder actuator module to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder that is to be deactivated once fuel that is present in the cylinder has been combusted.

In various implementations, the cylinder actuator module may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module. In various implementations, cylinders may be deactivated (i.e., turned OFF) without disabling the opening and closing of the intake and exhaust valves. In such implementations, the cylinder actuator module may be omitted and the cylinders may be deactivated by simply disabling fuel and spark to those cylinders.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current APC. The fuel control module 240 may instruct the fuel actuator module 124 to inject this fuel mass for each cylinder that is activated (i.e., ON).

Based on the fuel mass torque request, the fuel control module 240 may selectively adjust the air/fuel ratio with respect to stoichiometry to increase or decrease engine output torque. The fuel control module 240 may then determine a fuel mass for each cylinder that achieves the desired air/fuel ratio. In compression-ignition engine systems, the fuel mass may be the primary actuator for controlling engine output torque. During fuel cutoff, the actuation module 224 may generate the fuel mass torque request such that the fuel control module 240 disables the provision of fuel to one or more cylinders.

A torque estimation module 244 may estimate torque output of the engine 102. This estimated torque may be used by the air control module 228 to perform closed-loop control of the engine airflow parameters, such as the throttle area, the MAF, the MAP, the APC, and the phaser positions. For example only, a torque relationship such as:

$$T=f(APC,S,I,E,AF,OT,\#) \quad (1)$$

may be defined, where torque (T) is a function of mass of air per cylinder (APC), spark advance (S), intake cam phaser position (I), exhaust cam phaser position (E), air/fuel ratio (AF), oil temperature (OT), and number of activated cylinders (#). This relationship may be modeled by an equation and/or may be stored as a lookup table. Additional parameters and/or actuator values may also be accounted for, such as the degree of opening of an exhaust gas recirculation (EGR) valve.

The torque estimation module 244 may determine the current APC based on the MAF and the RPM, thereby allowing closed-loop control of the engine airflow parameters control based on current engine airflow conditions. The intake and exhaust cam phaser positions used may be based on actual positions, as the phasers may be traveling toward desired positions.

The torque estimation module 244 may use the actual spark timing to estimate the engine output torque. When a calibrated spark advance value is used to estimate the engine output torque, the estimated torque may be called an estimated air torque, air torque, or indicated torque. The estimated air torque is an estimate of how much torque the engine 102 could generate with the current airflow conditions if spark retard was removed (i.e., spark timing was set to the calibrated spark advance value) and all cylinders were fueled. The estimated air torque does not account for various losses that are accounted for in determining a brake torque, such as engine pumping losses, friction losses, and accessory loads on the engine 102.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed-loop control of the engine airflow actuators. For example, the desired area signal may be controlled to minimize a difference between the estimated air torque and the air torque request.

The air control module 228 may output a desired MAP signal to a boost scheduling module 248. The boost scheduling module 248 may use the desired MAP signal to control the boost actuator module 164. The boost actuator module 164 then controls the boost device(s). The desired MAP may also be used by the throttle actuator module 116 in controlling the throttle valve 112.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, the calibrated spark advance value may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \qquad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to a mean best torque (MBT) as possible. MBT refers to the maximum engine output torque that is achievable for a given engine airflow conditions as the spark timing is advanced toward the calibrated spark advance, while using fuel having an octane rating greater than a predetermined octane rating and using stoichiometric fueling. The spark advance at which the MBT occurs is referred to as MBT spark timing. The calibrated spark advance may differ slightly from MBT spark timing because of, for example, fuel quality (such as when lower octane fuel is used) and environmental factors. The engine output torque produced using the calibrated spark advance may therefore be less than the MBT.

The fuel cutoff module 270 may selectively generate an axle torque request for fuel cutoff (FCO) events. For example only, the fuel cutoff module 270 may generate an axle torque request to control performance of a clutch fuel cutoff (CFCO) event and/or a deceleration fuel cutoff (DFCO) event. The fuel cutoff module 270 may also generate an axle torque request for other types of FCO events.

The torque request generated by the fuel cutoff module 270 may be referred to as a FCO torque request. When received, the axle torque arbitration module 204 may set the immediate torque request equal to the FCO torque request. In some hybrid vehicles, the fuel cutoff module 270 may provide the FCO torque request (as a propulsion torque request) to the propulsion torque arbitration module 206. The actuation module 224 may provide the spark, cylinder, and/or fuel mass torque requests based on the immediate torque request. In this manner, the fast actuators are controlled based on the FCO torque request.

A FCO event may be initiated, for example, when the driver torque request and the estimated air torque reach a minimum engine ON torque. For example only, the driver torque request may reach the minimum engine ON torque when the driver removes pressure from the accelerator pedal for a period of time. The minimum engine ON torque may refer to the engine output torque produced with all of the cylinders fueled (i.e., ON) with the spark timing for all of the cylinders retarded to a fully retarded spark timing. The fully retarded spark timing may refer to when the spark timing is retarded to a greatest extent possible while maintaining proper combustion. Retarding the spark timing from the fully retarded spark timing may cause misfire, an engine stall, and/or other improper combustion. For example only, the minimum engine ON torque may be approximately −5 Nm.

The fuel cutoff module 270 may also wait to initiate the FCO event until a torque converter slip is under control. The torque converter slip may refer to a difference between the engine speed (i.e., RPM) and a transmission input shaft speed. The torque converter slip may be deemed under control when, for example, the torque converter slip is less than a predetermined slip, such as approximately 30 revolutions per minute. For the torque converter slip to be deemed under control, the slip may be required to stay less than the predetermined slip for a predetermined period, such as approximately 200 ms.

When the FCO event is initiated, the fuel cutoff module 270 ramps the FCO torque request from the minimum engine ON torque to a minimum engine OFF torque. The minimum engine OFF torque may refer to the engine torque output with combustion within each of the cylinders disabled. Stated differently, the minimum engine OFF torque may refer to the amount of torque necessary to overcome engine friction and engine pumping losses and to rotate the crankshaft. For example only, the minimum engine OFF torque may be approximately −30 Nm for an engine system.

As the fuel cutoff module 270 ramps the FCO torque request from the minimum engine ON torque to the minimum engine OFF torque for the FCO event, the cylinder control module 236 turns the cylinders OFF. In other words, the cylinder control module 236 disables the provision of fuel and spark to the cylinders as the FCO torque request ramps from the minimum engine ON torque to the minimum engine OFF torque. The cylinder control module 236 may disable the cylinders (i.e., turn the cylinders OFF) one-by-one as a lesser number of cylinders is needed to achieve the FCO torque request with the spark timing at the fully retarded spark timing.

When the FCO event ends (e.g., when the driver torque request begins to increase), the fuel cutoff module 270 may begin to ramp the FCO torque request up from the minimum engine OFF torque. Increasing the FCO torque request may cause the cylinder control module 236 to request the fuel control module 240 to supply fuel to and the spark control module 232 to initiate combustion in (i.e., turn ON) cylinders as more cylinders are needed to achieve the FCO torque request.

However, there is a delay period between when the cylinder control module 236 requests fueling of a given cylinder and when the requested fuel is actually combusted within the given cylinder. The delay may be attributable to: (1) a hardware interface input/output (HWIO) delay between when the request for fuel is made and when the fuel is actually supplied to the given cylinder; and (2) a combustion delay between when the fuel is supplied to the given cylinder and when the requested fuel is actually combusted within the given cylinder. For example only, the HWIO delay may include approximately 3 to 5 crankshaft revolutions, and the combustion delay may be approximately one-quarter to one-half of one crankshaft revolution.

The fuel cutoff module 270 may continue the ramping of the FCO torque request during the delay. The delay (and more particularly the number of cylinders that are being fueled) and the ramping of the FCO torque request may cause the spark control module 232 to advance the spark timing relative to the fully retarded spark timing in an attempt to achieve the FCO torque request.

However, having the spark timing as close as possible to the fully retarded spark timing for the first combustion events of the cylinders, respectively, after a FCO event may be desirable to minimize noise, vibration, and harshness (NVH). In other words, setting the spark timing as close as possible to the fully retarded spark timing for the first combustion events after the FCO event may minimize the vibration experienced within a passenger cabin during the transition out of the FCO event.

When the FCO event ends, the fuel cutoff module 270 of the present disclosure determines a feed-forward (FF) number of cylinders. The fuel cutoff module 270 may also maintain the FCO torque request at the minimum engine OFF torque. The fuel cutoff module 270 feeds forward the FF number of cylinders (FF #) to the cylinder control module 236.

The FF number of cylinders may correspond to a number of cylinders that, if the fuel cutoff module 270 began ramping up the FCO torque request when the FCO event ended, would correspond to the number of ON cylinders that would achieve the FCO request at the fully retarded spark timing after the delay. For example only, the FF number of cylinders may be 4 for a four cylinder a four-cylinder engine, 4 for an eight-cylinder engine, 3 for a six-cylinder engine, or other numbers of cylinders for other engines.

The fuel cutoff module 270 may determine the FF number based on, for example, a rate of increase of the driver torque request and/or a rate of decrease of the RPM. For example only, the FF number may increase as the rate of increase in the driver torque request increases and/or as the rate of decrease in the RPM increases.

The fuel cutoff module 270 may also determine a diagnostic number of cylinders based on whether a diagnostic module 272 is generating a diagnostic request. For example only, the diagnostic module 272 may generate the diagnostic request to diagnose whether the catalyst 136 is faulty and/or whether an oxygen sensor (not shown) that is located downstream of the catalyst 136 (i.e., a post-catalyst oxygen sensor) is faulty during a transition from a FCO event.

The diagnostic request may command a transition in the air/fuel mixture first to a rich mixture and second to a lean mixture or vice versa. The diagnostic module 272 may monitor a period between when the transition is accomplished and when the signal output by the oxygen sensor reflects the transition. The diagnostic module 272 may diagnose faults in the catalyst 136 and/or the oxygen sensor based on a comparison of the period and a predetermined period.

The diagnostic module 272 transmits the diagnostic request to the fuel cutoff module 270. The fuel cutoff module 270 may determine the diagnostic number or may set the diagnostic number to a predetermined number. The fuel cutoff module 270 may determine the diagnostic number based on a predetermined period during which the diagnostic module 272 needs a transition to be performed for the fault diagnostic to be accurate. For example only, as the predetermined period decreases, the diagnostic number may increase. In this manner, the diagnostic number may increase to turn more cylinders ON and accomplish the transition faster when the predetermined period is decreased. The fuel cutoff module 270 may set the FF number of cylinders equal to the greater of the FF number and the diagnostic number.

The cylinder control module 236 commands the fuel control module 240 to provide fuel to the FF number of cylinders when appropriate (e.g., during the intake strokes of the cylinders, respectively) upon receipt of the FF number. The cylinder control module 236 commands the spark control module 232 to provide spark to the FF number of cylinders during the expansion strokes of the cylinders, respectively. Because the fuel cutoff module 270 maintains the FCO torque request at the minimum engine OFF torque, the spark control module 232 maintains the spark timing for the first combustion events of the number of cylinders at the fully retarded spark timing.

The fuel cutoff module 270 may maintain the FCO torque request at the minimum engine OFF torque until the actual number of cylinders that are ON (i.e., being supplied fuel) reaches the FF number of cylinders. In various implementations, the fuel cutoff module 270 may maintain the FCO torque request at the minimum engine OFF torque until the actual number of cylinders that are ON reaches a predetermined ratio or fraction of the total number of cylinders. For example only, the predetermined ratio may be approximately 0.25, which may correspond to 2 in an eight-cylinder engine. Once the actual number of cylinders that are ON reaches the FF number of cylinders or the predetermined ratio, the fuel cutoff module 270 may begin to ramp up the FCO torque request.

The fuel cutoff module 270 may receive the actual number of cylinders that are ON (actual # ON) from the cylinder control module 236. The actual number of cylinders that are ON may be determined based on, for example, the RPM, one or more operating parameters, or the actual number of cylinders that are ON may be inferred based on knowledge of the delay associated with turning a given cylinder ON.

When the actual number of cylinders that are ON reaches the FF number of cylinders, the fuel cutoff module 270 may begin to ramp the FCO torque request up. The fuel cutoff module 270 may ramp the fuel cutoff request up from the minimum engine OFF torque. The fuel cutoff module 270 may determine a ramp rate for the ramping of the FCO torque request based on, for example, the rate of decrease of the RPM, the rate of increase of the driver torque request, and/or whether the diagnostic module 272 is generating the diagnostic request.

The cylinder control module 236 selectively commands that the one or more of the remaining cylinders be turned ON. For example only, the cylinder control module 236 may selectively command that the one or more of the remaining (OFF) cylinders be turned ON using the equations:

$$\text{Desired Cyl Indicated Torque} = \text{CSO Torque Request} + F + P + A; \quad (3)$$

$$\text{Available Indicated Torque} = \text{Estimated Air Torque} + F + P + A; \quad (4)$$

$$\text{CSO Fraction} = \text{Desired Cyl Indicated Torque}/\text{Available Indicated Torque}; \quad (5)$$

$$\text{Desired \# Fueled} = \text{CSO Fraction} * \text{Total \#} + FF\ \#, \quad (6)$$

where Desired Cylinder Indicated Torque is a desired indicated torque for the engine 102, CSO stands for cylinder shut off, F is an estimate of the frictional losses of the engine 102, P is an estimate of the pumping losses of the engine 102, A is an estimate of the load on the engine 102 imposed by accessories (e.g., NC, power steering, etc.), CSO Fraction is a fraction of the total number of cylinders that should be ON, total # is the total number of cylinders of the engine 102, Desired # Fueled is a number of cylinders that should be turned ON, and FF # is the FF number of cylinders. The desired indicated torque is a desired torque to be produced by combustion in the cylinders. The CSO torque request is desired torque at the output of the engine 102. The frictional losses F, the pumping losses P, and the accessory load losses are added to the CSO torque request to determine the indicated torque that corresponds to the CSO torque request. The cylinder control module 236 may truncate the Desired # Fueled or round the Desired # Fueled up to a nearest integer. The CSO torque request may be set equal to the FCO torque request. The cylinder control module 236 may also turn OFF cylinders when a FCO event is enabled using the above equations.

When the additional cylinder turns ON, the actual number of cylinders that are ON increases. As more cylinders are ON and available to produce torque and achieve the FCO torque request, the spark control module 232 retards the spark timing toward the fully retarded spark timing. This process may continue until all of the cylinders of the engine 102 are turned ON.

Because the FF number of cylinders (or the predetermined ratio of the total number of cylinders) are actually ON before the fuel cutoff module 270 begins to ramp up the FCO torque request, the spark control module 232 sets the spark timing for the first combustion events of the FF number of cylinders (or the predetermined ratio of the total number of cylinders) to the fully retarded spark timing. The spark timing for the first combustion events of other cylinders that are turned ON later is also adjusted toward or to the fully retarded spark timing. In this manner, the desired experience is provided within the passenger cabin.

Figure 3:
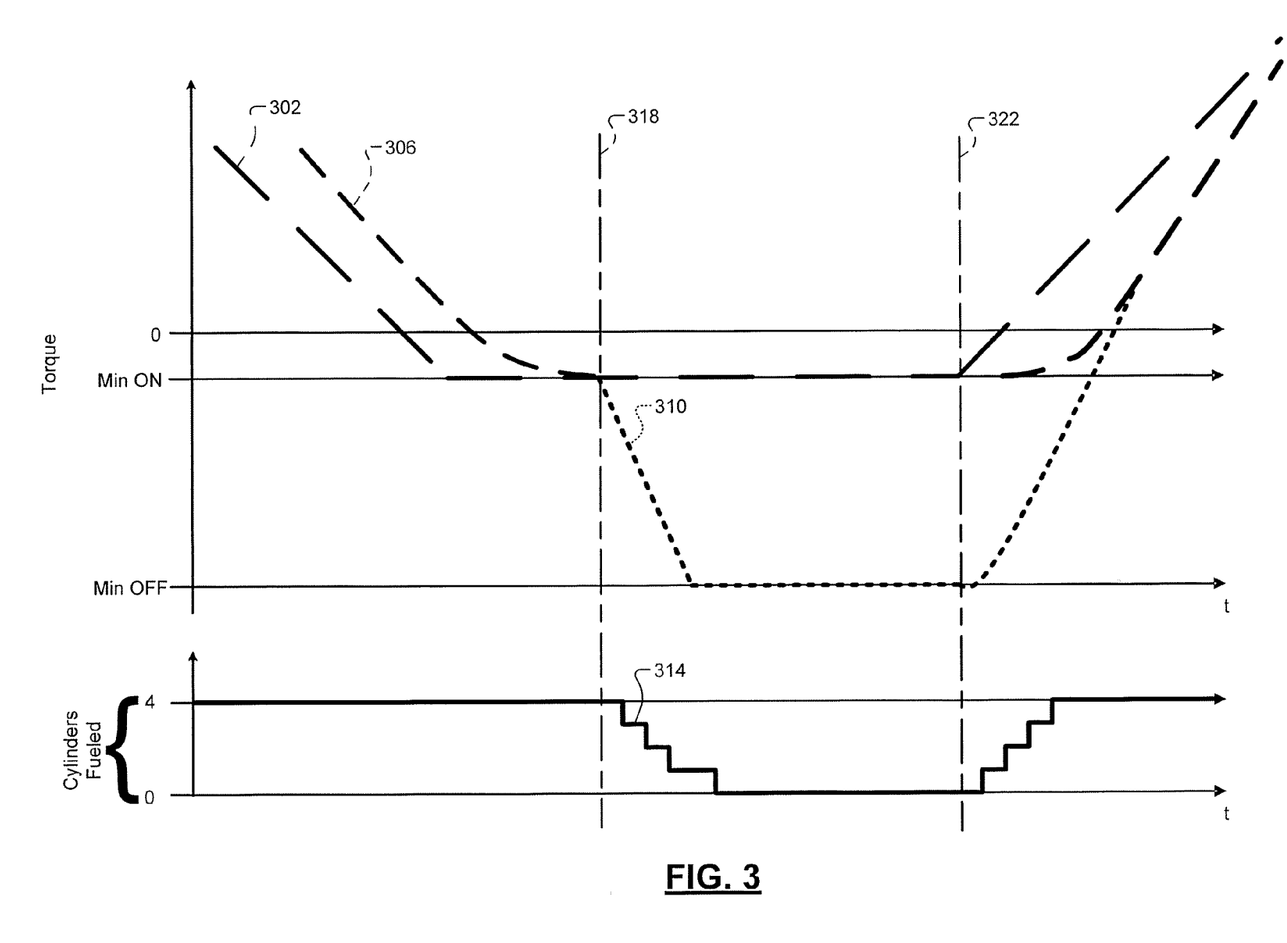
FIG. 3 is an exemplary graph of driver torque request, estimated air torque, fuel cutoff (FCO) torque request, and number of cylinders fueled as functions of time according to the principles of the present disclosure.

Referring now to FIG. 3, graphs of actual number of cylinders ON and various torques and torque requests as functions of time are presented. Exemplary dashed trace 302 tracks the driver torque request. Exemplary dashed trace 306 tracks the estimated air torque. Exemplary dashed trace 310 tracks the FCO torque request. Exemplary trace 314 tracks the actual number of cylinders that are ON (i.e., being fueled). The exemplary embodiment of FIG. 3 corresponds to an exemplary four-cylinder engine.

When the driver torque request 302 and/or the estimated air torque 306 reach the minimum engine ON torque, the fuel cutoff module 270 may initiate a FCO event. The fuel cutoff module 270 may also wait for the torque converter slip to be less than the predetermined slip before initiating the FCO event.

The fuel cutoff module 270 may initiate the FCO event at approximately time 318. The fuel cutoff module 270 begins ramping the FCO torque request 310 from the minimum engine ON torque to the minimum engine OFF torque at approximately time 318 for the FCO event.

As the FCO torque request 310 decreases toward the minimum engine OFF torque, the cylinder control module 236 may disable the provision of fuel and spark to one cylinder at a time, as illustrated by the steps in the actual number of cylinders ON 314, as one less cylinder is needed to achieve the FCO torque request 310. The diagnostic module 272 may also generate the diagnostic request such that the cylinders are turned OFF at a faster rate, such as more than one cylinder or all of the cylinders at a time.

The FCO event ends at approximately time 322. The fuel cutoff module 270 provides the FF number of cylinders to the cylinder control module 236. The fuel cutoff module 270 may determine the FF number of cylinders based on the rate of the decrease in the RPM, whether the diagnostic module 272 is generating the diagnostic request, and/or the rate of increase of the driver torque request. For the exemplary four-cylinder engine of the exemplary embodiment of FIG. 3, the fuel cutoff module 270 may set the FF number of cylinders to 4. The cylinder control module 236 then commands the fuel control module 240 to turn ON (i.e., supply fuel to) the FF number of cylinders.

Figure 4:
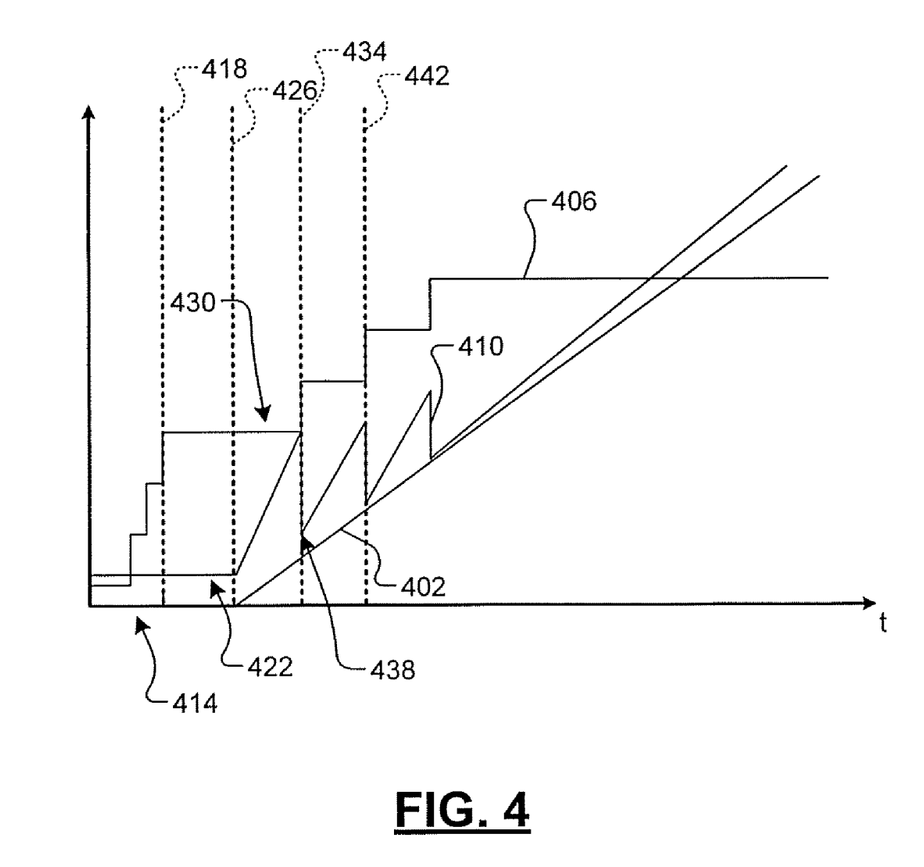
FIG. 4 is an exemplary graph of the FCO torque request, the number of cylinders fueled, and spark timing as functions of time according to the principles of the present disclosure.

Referring now to FIG. 4, an exemplary graph of the actual number of cylinders that are ON, the spark timing, and the FCO torque request as functions of time are presented. Exemplary trace 402 tracks the FCO torque request. Exemplary trace 406 tracks the actual number of cylinders that are ON. Exemplary trace 410 tracks the spark timing. The exemplary embodiment of FIG. 4 corresponds to an exemplary six-cylinder engine.

The fuel cutoff module 270 provides the FF number of cylinders to the cylinder control module 236. For the exemplary six-cylinder engine of the exemplary embodiment of FIG. 4, the FF number of cylinders may be 3. The cylinder control module 236 commands the fuel control module 240 to supply fuel to and the spark control module 232 to initiate combustion in the FF number of cylinders.

Until the actual number of cylinders that are ON reaches the FF number of cylinders (or until the predetermined ratio of the total number of cylinders), the fuel cutoff module 270 maintains the FCO torque request 402 at the minimum engine OFF torque. The maintenance of the FCO torque request 402 is shown at 414. After the delay, at approximately time 418, the FF number of cylinders are ON. In other words, the actual number of cylinders that are ON 406 reaches the FF number of cylinders at approximately time 418.

Because the FCO torque request (and therefore the spark torque request) is maintained at the minimum engine OFF torque while the FF number of cylinders (or while the predetermined ratio of the total number of cylinders) are turned ON, the spark control module 232 maintains the spark timing 410 at the fully retarded spark timing. The maintenance of the spark timing 410 at the fully retarded spark timing is shown at 422.

Once the actual number of cylinders that are ON 406 reaches the FF number of cylinders, the fuel cutoff module 270 may begin to ramp the FCO torque request 402 up from the minimum engine OFF torque. In the exemplary embodiment of FIG. 4, the fuel cutoff module 270 may begin to ramp up the FCO torque request at approximately time 426.

As the FCO torque request 402 ramps up, the cylinder control module 236 selectively requests that one or more additional cylinders be turned ON to achieve the FCO torque request. More specifically, as the FCO torque request 402 increases, the desired cylinder indicated torque increases (see equation (3) above), and the Shut Off Fraction increases (see equation (5) above). The cylinder control module 236 may request the fuel control module 240 to turn ON an additional cylinder when the desired number of cylinders to be fueled increases, as discussed above with respect to equation (6). For example only, the desired number of cylinders to be fueled may increase by one after approximately time 426, and the cylinder control module 236 may request that an additional cylinder be turned ON.

After the delay associated with turning the additional cylinder ON, as illustrated by the actual number of cylinders that are ON 406 remaining unchanged at 430, the additional cylinder turns ON. During the delay, the FCO torque request 402 continues to ramp up, and the spark control module 232 selectively advances the spark timing 410 from the fully retarded spark timing to achieve the FCO torque request using the actual number of cylinders that are ON 406. The advancement of the spark timing 410 is shown by the increase in the spark timing 410 between time 426 and time 434.

The additional cylinder turns ON at time 434, as illustrated by the increase in the actual number of cylinders that are ON 406. Accordingly, as the actual number of cylinders that are ON 406 and available to produce torque has increased, the spark control module 232 retards the spark timing 410 back toward the fully retarded spark timing at approximately time 434 to achieve the FCO torque request 402 using the actual number of cylinders that are ON 406. The retardation of the spark timing 410 toward the fully retarded spark timing is illustrated at 438. In various implementations, (e.g., when the ramp rate is slow enough), the spark timing 410 may be retarded to the fully retarded spark timing.

The cylinder control module 236 may request that another additional cylinder be turned ON at approximately time 434. For example only, the cylinder control module 236 may request the fuel control module 240 to turn ON the other additional cylinder using the equations described above. During the delay associated with turning the other additional cylinder ON, as the FCO torque request 402 continues to ramp up, the spark control module 232 advances the spark timing 410 to achieve the FCO torque request 402 using the cylinders that are actually ON (at this time the FF number of cylinders and the additional cylinder).

The other additional cylinder turns ON at approximately time 442. Accordingly, as the actual number of cylinders that are ON 406 and available to produce torque has increased, the spark control module 232 retards the spark timing 410 back toward the fully retarded spark timing at approximately time 442. This process of requesting that cylinder(s) be turned ON, advancing the spark timing during the delay in turning the cylinder(s) ON, and retarding the spark timing toward the fully retarded spark timing when the cylinder(s) actually turn ON may continue until all of the cylinders are turned ON.

Figure 5:
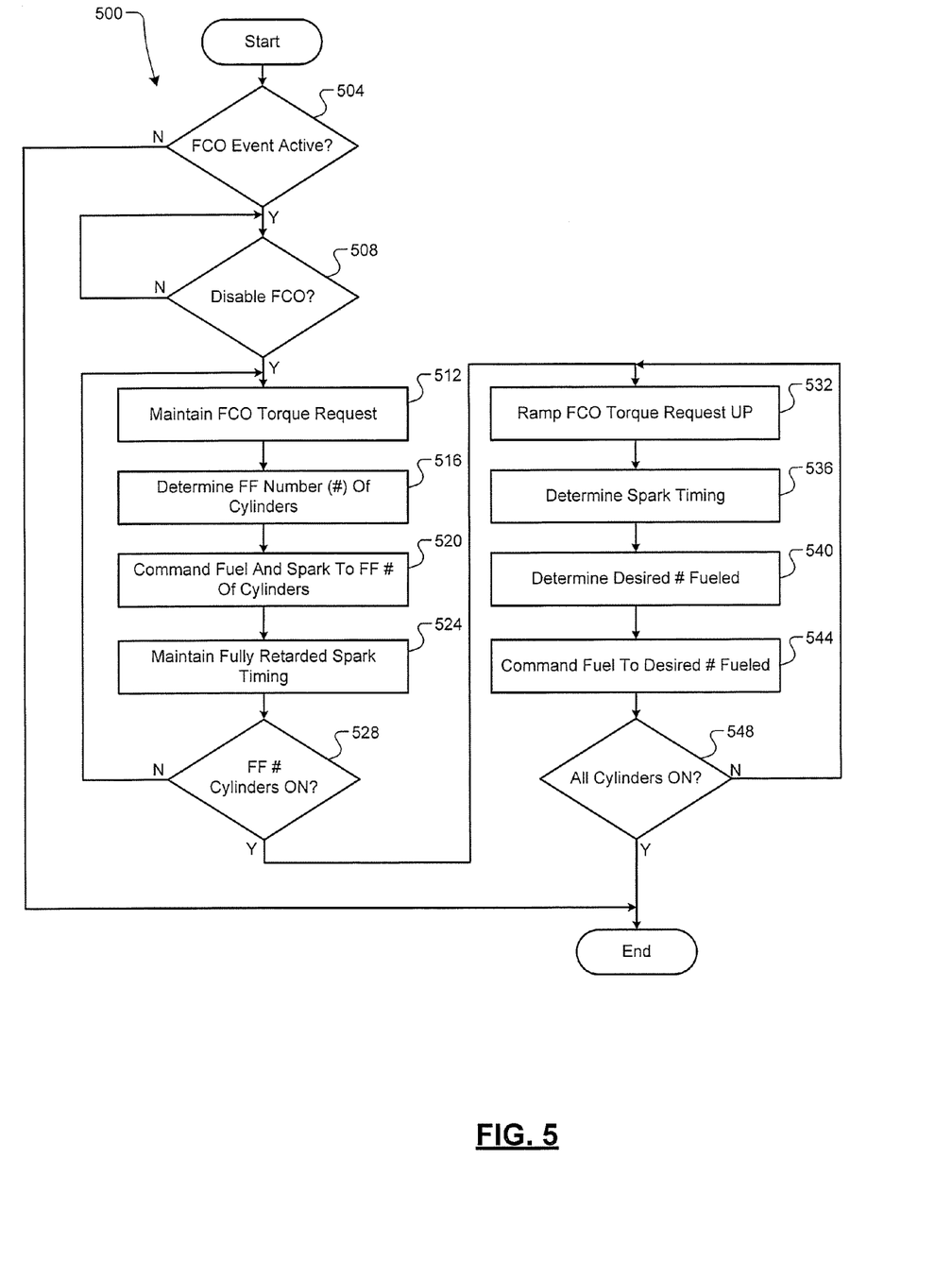
FIG. 5 is a flowchart depicting an exemplary method of transitioning out of a FCO event according to the principles of the present disclosure.

Referring now to FIG. 5, a flowchart depicting an exemplary method 500 of controlling a transition from a FCO event to is presented. Control may begin with 504 where control determines whether a FCO event is occurring. If false, control may end; if true, control may continue with 508. Control may determine whether to end FCO event at 508. If true, control may continue with 512; if false, control may remain at 508.

Control may maintain the FCO torque request at the minimum engine OFF torque at 512. Control determines the number of cylinders and feeds forward the feed-forward (FF) number of cylinders at 516. Control commands the provision of fuel and spark to the FF number of cylinders at 520. In other words, control commands that the FF number of cylinders be turned ON at 520.

Control maintains the spark timing at the fully retarded spark timing at 524. More specifically, because the FCO torque request is maintained at the minimum engine OFF torque (at 512), control may set the spark timing to the fully retarded spark timing to achieve the FCO torque request. Control determines whether the FF number of cylinders are actually ON (i.e., fueled) at 528. Alternatively, control may determine whether the predetermined fraction of the total number of cylinders are actually ON at 528. If true, control may continue with 532; if false, control may return to 512.

At 532, control may begin ramping up the FCO torque request. Control determines the spark timing based on the FCO torque request at 536. Control may determine the spark timing, for example, using equation (2), as discussed above. In this manner, control determines the spark timing further based on the actual number of cylinders that are ON.

Control determines the desired number of cylinders that should be fueled (Desired # Fueled) at 540. Control may determine the desired Number of cylinders that should be fueled (i.e., turned ON) using equations (3)-(6), as discussed above. Control commands fuel to the desired # of cylinders at 544. Control determines whether all of the cylinders (i.e., the total number of cylinders) are actually ON at 548. If true, control may end; if false, control may return to 532.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
    a fuel cutoff (FCO) module that, when a FCO event is disabled, determines a feed-forward (FF) number of cylinders to offset a delay period associated with supplying fuel to the cylinders of an engine and selectively maintains a FCO torque request at a predetermined torque;
    a fuel control module that commands fuel be supplied to the FF number of cylinders of the engine when the FCO event is disabled; and
    a spark control module that maintains a spark timing of the FF number of cylinders at a fully retarded spark timing based on the FCO torque request.

2. The engine control system of claim 1 wherein the spark control module maintains the spark timing further based on an actual number of cylinders being fueled.

3. The engine control system of claim 1 wherein the FCO module maintains the FCO torque request at the predetermined torque until one of the fuel has been supplied to the FF number of cylinders and a predetermined ratio of a total number of cylinders of the engine.

4. The engine control system of claim 3 wherein the FCO module increases the FCO torque request after the fuel has been supplied to the FF number of cylinders.

5. The engine control system of claim 4 wherein the spark control module selectively advances the spark timing from the fully retarded spark timing based on the increase, and
    wherein the fuel control module selectively commands fuel to an additional cylinder based on the FCO torque request and the FF number of cylinders.

6. The engine control system of claim 5 wherein the spark control module retards the spark timing toward the fully retarded spark timing when the fuel is supplied to the additional cylinder.

7. The engine control system of claim 1 wherein the predetermined torque is negative and is determined based on a sum of friction losses of the engine, engine pumping losses, and accessory loads imposed on the engine.

8. The engine control system of claim 1 wherein the FCO module determines the FF number of cylinders based on a rate of decrease of an engine speed.

9. The engine control system of claim 1 wherein the FCO module determines the FF number of cylinders based on a rate of increase of a driver torque request.

10. The engine control system of claim 1 further comprising a diagnostic module that selectively monitors a response to one of a lean to rich transition and a rich to lean transition and that diagnoses a fault in at least one of a catalyst and an oxygen sensor located downstream of the catalyst based on the response;
    wherein the FCO module determines the FF number of cylinders based on whether the diagnostic module is monitoring the response.

11. An engine control method comprising:
    determining a feed-forward (FF) number of cylinders to offset a delay period associated with supplying fuel to the cylinders of an engine when a FCO event is disabled;
    selectively maintaining a FCO torque request at a predetermined torque when the FCO event is disabled;
    commanding fuel be supplied to the FF number of cylinders of the engine when the FCO event is disabled; and
    maintaining a spark timing of the FF number of cylinders at a fully retarded spark timing based on the FCO torque request when the FCO event is disabled.

12. The engine control method of claim 11 further comprising maintaining the spark timing further based on an actual number of cylinders being fueled.

13. The engine control method of claim 11 further comprising maintaining the FCO torque request at the predetermined torque until the fuel has been supplied to one of the FF number of cylinders and a predetermined ratio of a total number of cylinders of the engine.

14. The engine control method of claim 13 further comprising increasing the FCO torque request after the fuel has been supplied to the FF number of cylinders.

15. The engine control method of claim 14 further comprising:
   selectively advancing the spark timing from the fully retarded spark timing based on the increase; and
   selectively commanding fuel to an additional cylinder based on the FCO torque request and the FF number of cylinders.

16. The engine control method of claim 15 further comprising retarding the spark timing toward the fully retarded spark timing when the fuel is supplied to the additional cylinder.

17. The engine control method of claim 11 further comprising determining the predetermined torque based on a sum of friction losses of the engine, engine pumping losses, and accessory loads imposed on the engine,
   wherein the predetermined torque is negative.

18. The engine control method of claim 11 further comprising determining the FF number of cylinders based on a rate of decrease of an engine speed.

19. The engine control method of claim 11 further comprising determining the FF number of cylinders based on a rate of increase of a driver torque request.

20. The engine control method of claim 11 further comprising:
   selectively monitoring a response to one of a lean to rich transition and a rich to lean transition;
   diagnosing a fault in at least one of a catalyst and an oxygen sensor located downstream of the catalyst based on the response; and
   determining the FF number of cylinders based on whether the response is being monitored.

* * * * *